(12) United States Patent
Mercier et al.

(10) Patent No.: US 10,703,463 B2
(45) Date of Patent: Jul. 7, 2020

(54) EASY-TO-MOUNT ACTUATOR

(71) Applicant: SAFRAN ELECTRONICS & DEFENSE, Boulogne Billancourt (FR)

(72) Inventors: Guillaume Mercier, Boulogne Billancourt (FR); Jérôme Mehez, Boulogne Billancourt (FR); Philippe Bezivin, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days.

(21) Appl. No.: 16/462,884

(22) PCT Filed: Nov. 21, 2017

(86) PCT No.: PCT/EP2017/079978
§ 371 (c)(1),
(2) Date: May 21, 2019

(87) PCT Pub. No.: WO2018/095934
PCT Pub. Date: May 31, 2018

(65) Prior Publication Data
US 2020/0079498 A1    Mar. 12, 2020

(30) Foreign Application Priority Data

Nov. 22, 2016 (FR) ..................................... 16 61371

(51) Int. Cl.
*B64C 13/50* (2006.01)
*B64C 9/02* (2006.01)
*B64C 13/34* (2006.01)

(52) U.S. Cl.
CPC ................ *B64C 13/50* (2013.01); *B64C 9/02* (2013.01); *B64C 13/34* (2013.01)

(58) Field of Classification Search
CPC ............................... B64C 13/34; B64C 13/50
See application file for complete search history.

(56) References Cited

U.S. PATENT DOCUMENTS

| 2,063,812 A | * | 12/1936 | James | B64C 13/34 244/231 |
| 2,127,864 A | * | 8/1938 | Girard | B64C 13/34 244/231 |
| 2011/0062282 A1 | * | 3/2011 | Richter | B64D 45/0005 244/99.4 |

FOREIGN PATENT DOCUMENTS

| EP | 0 873 937 A2 | 10/1998 |
| EP | 2 371 709 A2 | 10/2011 |
| GB | 2 277 305 A | 10/1994 |
| WO | WO 2009/118547 A2 | 10/2009 |

(Continued)

*Primary Examiner* — Richard G Davis
(74) *Attorney, Agent, or Firm* — Muncy, Geissler, Olds & Lowe, P.C.

(57) ABSTRACT

An actuator for at least one flight control surface of an aircraft. The actuator has at least two actuator members for actuating the flight control surface between two extreme positions and a motor connected to the actuator members by at least one rotary motion transmission line. Each actuator member includes a drive pinion and the actuator is arranged so that the transmission line has an angular amplitude of less than one revolution during movement of the flight control surface between its two positions. The motion transmission line is arranged to allow only one angular position between the drive pinions and the actuator member.

9 Claims, 3 Drawing Sheets

(56) References Cited

FOREIGN PATENT DOCUMENTS

WO    WO 2009/135653 A1    11/2009
WO    WO 2013/007987 A2    1/2013

* cited by examiner

US 10,703,463 B2

EASY-TO-MOUNT ACTUATOR

BACKGROUND OF THE INVENTION

Field of the Invention

The present invention relates to the field of aviation, and more particularly to actuating flight control surfaces of an aircraft such as ailerons, rudders, flaps, slats, elevators, . . . .

Brief Description of the Related Art

Flight control surfaces are hinged to the structure of the aircraft so as to be movable between two extreme positions, and they are moved between those two positions by actuator members having an inlet pinion connected to a transmission line connecting the actuator members to one another and to a common motor controlled by a control unit of the aircraft. The transmission line comprises shafts that are coupled to one another via fluted segments. That solution is relatively complex, in particular because it is necessary for the shafts to be set angularly relative to one another in order to ensure that the actuator members acting on a common flight control surface are synchronized. Unfortunately, the actuator system is so arranged that actuating the flight control surfaces between their extreme positions requires the shafts to turn through more than one revolution: a given angular position of a shaft can thus correspond to a plurality of positions of the flight control surfaces. That greatly complicates initial assembly of the actuator system and also subsequent maintenance operations.

Proposals have been made to associate at least one actuator with each flight control surface and to connect all of the actuators to the control unit. The term "actuator" is used to mean a motor having a stator fastened to the structure of the aircraft and a rotor connected by a motion transmission line to an actuator member that is connected to the flight control surface in order to exert a force thereon for the purpose of moving it. This results in relatively large weight for the actuator system as a whole.

Furthermore, given the size of flight control surfaces and the stresses to which they are subjected, at least two actuators are generally provided per flight control surface, thereby correspondingly increasing the overall weight of the actuator system, and once more it is necessary for the angles between those actuators acting on a given flight control surface to be set mutually.

SUMMARY OF THE INVENTION

An object of the invention is to simplify the system for actuating flight control surfaces of an aircraft.

To this end, the invention provides a flight control surface actuator, the actuator comprising at least two actuator members for actuating the flight control surface between two extreme positions and a motor connected to the actuator members by at least one rotary motion transmission line. Each actuator member comprises a drive pinion and the actuator is arranged so that the transmission line has an angular amplitude of less than one revolution during movement of the flight control surface between its two positions, and the motion transmission line is arranged to allow only one angular position between the pinions of the actuator members.

Thus, the angular amplitude of less than one revolution and the arrangement of the transmission line for allowing only one angular position between the inlet pinions makes the actuator easier to assemble and to maintain.

BRIEF DESCRIPTION OF THE DRAWINGS

Other characteristics and advantages of the invention appear on reading the following description of particular, non-limiting embodiments of the invention.

Reference is made to the accompanying drawings, in which.

DETAILED DESCRIPTION OF THE PREFERRED EMBODIMENTS

Figure 1:
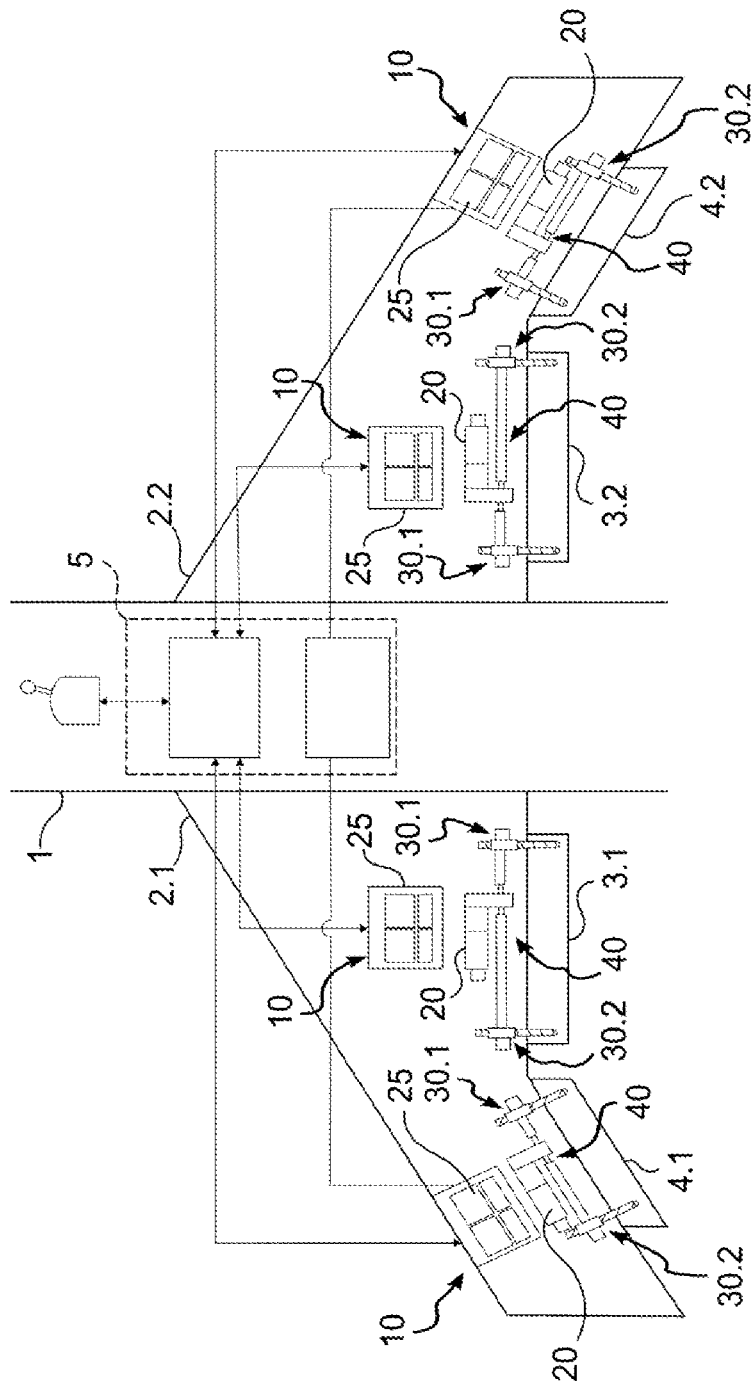
FIG. 1 is a fragmentary diagrammatic plan view of an aircraft of the invention.

With reference to the figures, the invention is described herein in its application to an aircraft having a fuselage 1 and two wings 2.1, 2.2, each provided with an inner flap 3.1, 3.2 and an outer flap 4.1, 4.2. In known manner, the flaps 3.1, 3.2, 4.1, 4.2 are mounted on the wings 2.1, 2.2 to pivot between two extreme positions, and they are moved between those two positions by an actuator system controlled by a control unit 5 of the aircraft. The control unit 5 is a set of computers that are connected to the control instruments of the cockpit and to sensors distributed over the aircraft, and that control the engines and the flight control surfaces of the aircraft as a function of actions exerted by the pilot on the control instruments.

In this example, the actuator system comprises one actuator per flap 3.1, 3.2, 4.1, 4.2.

Each actuator, given overall reference 10, comprises a structure 11 carrying a single motor 20 driving at least two members 30.1, 30.2 for actuating the flap 3.1, 3.2, 4.1, 4.2 between its two extreme positions.

The motor 20 is a rotary electric motor having a rotary portion that co-operates with:

a resolver 23 serving to detect the angular position of said rotary portion relative to a predetermined reference position; and a brake 24 arranged to block rotation of said rotary portion.

The resolver 23 and the brake 24 are connected to a control module 25 that is connected to the control unit 5 in order to be controlled thereby. The control module 25 comprises an electronic control circuit and an electronic power circuit that are themselves known, the electronic power circuit being controlled by the electronic control circuit, which is connected to the control unit 5.

The rotary portion of the motor 20 has an outlet shaft 21 connected via a reduction gearset 22 to a pinion 31.1 of the actuator member 30.1. The pinion 31.1 is secured to a shaft 32.1 mounted to pivot relative to the structure 11 and meshes with a toothed sector 33.1 mounted to pivot on the structure 11, while being secured to the flap 3.1, 3.2, 4.1, 4.2 in such a manner that when the toothed sector 33.1 is turned, it drives pivoting of the flap 3.1, 3.2, 4.1, 4.2. The shaft 32.1 also has a ratchet wheel 34.1 mounted thereon that co-operates with a pawl 35.1 controlled by a solenoid 36.1 to move between a release position in which the pawl 35.1 is disengaged from the ratchet wheel 34.1, so as to allow the shaft 32.1 to turn freely in both directions of rotation, and a position in which the pawl 35.1 is engaged with the ratchet wheel 36.1, allowing the shaft 32.1 to turn in one direction only. The solenoid 36.1 is connected to the control module 25 to be controlled thereby. The actuator member 30.1 has a resolver 37.1 that is mounted on the structure 11 to detect the angular position of the shaft 32.1 and that is connected to the control module 25 in order to supply it with that angular position.

The actuator member 30.2 also has a pinion 31.2 that is secured to a shaft 32.2 mounted to pivot on the structure 11 and that meshes with a toothed sector 33.2 mounted to pivot on the structure 11 while being secured to the flap 3.1, 3.2, 4.1, 4.2 in such a manner that when the toothed sector 33.2 is turned, it drives the flap 3.1, 3.2, 4.1, 4.2 to pivot therewith. The shaft 32.2 also has a ratchet wheel 34.2 mounted thereon that co-operates with a pawl 35.2 controlled by a solenoid 36.2 to move between a release position in which the pawl 35.2 is disengaged from the ratchet wheel 34.2, so as to allow the shaft 32.2 to turn freely in both directions of rotation, and a position in which the pawl 35.2 is engaged with the ratchet wheel 34.2, allowing the shaft 32.2 to turn in one direction only. The solenoid 36.2 is connected to the control module 25 in order to be controlled thereby. The actuator member 30.2 includes a resolver 37.2 that is mounted on the structure 11 in order to detect the angular position of the shaft 32.2 and that is connected to the control module 25 in order to supply it with that angular position.

The shaft 32.1 has one end connected by a Cardan joint 41.1 to turn with one end of a shaft 42.1 of a motion transmission line 40. The shaft 32.2 has one end connected by a Cardan joint 41.2 to turn with one end of a shaft 42.2 of the motion transmission line 40. The shaft 42.1 has an opposite end releasably connected by a coupling 43 to an end of the shaft 42.2 that is opposite from the Cardan joint 41.2. The coupling 43 provides a connecting that is indexed in rotation between the shafts 42.1 and 42.2. The term "connecting that is indexed in rotation" is used to mean a connection that allows the shafts 42.1 and 42.2 to be connected together in only one relative angular position. The connection in this example is also a releasable sliding connection that makes it possible firstly to avoid the appearance of stresses generated by deformation of the wing, and secondly to make coupling and uncoupling easy between the shafts 42.1 and 42.2. By way of example, such a connection may be obtained by wedging. The motion transmission line 40 is thus arranged to allow only one angular position between the pinions 31.1 and 31.2.

The actuator is arranged so that the transmission line 40 has an angular amplitude of less than one revolution during movement of the flap 3.1, 3.2, 4.1, 4.2 between its two extreme positions. This is obtained from the reduction ratios existing between the gears of the gearset 22, between the outlet pinion of the gearset 22 and the pinion 31.1, and between each pinion 31.1, 31.2 and the respective toothed sector 33.1, 33.2.

It can be understood that this arrangement makes it easier to connect together the actuator members 30.1 and 30.2 of each actuator 10 since there exists only one relative angular position between the shafts 32.1 and 32.2.

An inertia-leveling member is preferably provided in the gearset 22 so as to prevent the kinetic energy stored in the motor leading to damage to the structure of the aircraft in the event of the transmission line blocking. By way of example, this member may be a torque limiter such as a friction limiter mounted on the transmission line in the vicinity of the motor.

The control unit 5 is arranged to be able to control the flaps in independent manner.

The invention enables the actuator members 30.1, 30.2 of a given flap to be synchronized mechanically by the transmission line 40, and enables the actuators 10 on a given wing or on both wings to be synchronized electrically via the control unit 5 by using the resolvers 37.1 and 37.2 that send the angular position of each actuator.

Elements identical or analogous to those described above are given identical numerical references in the description below of the second embodiment, and in corresponding FIG. 3.

Figure 2:
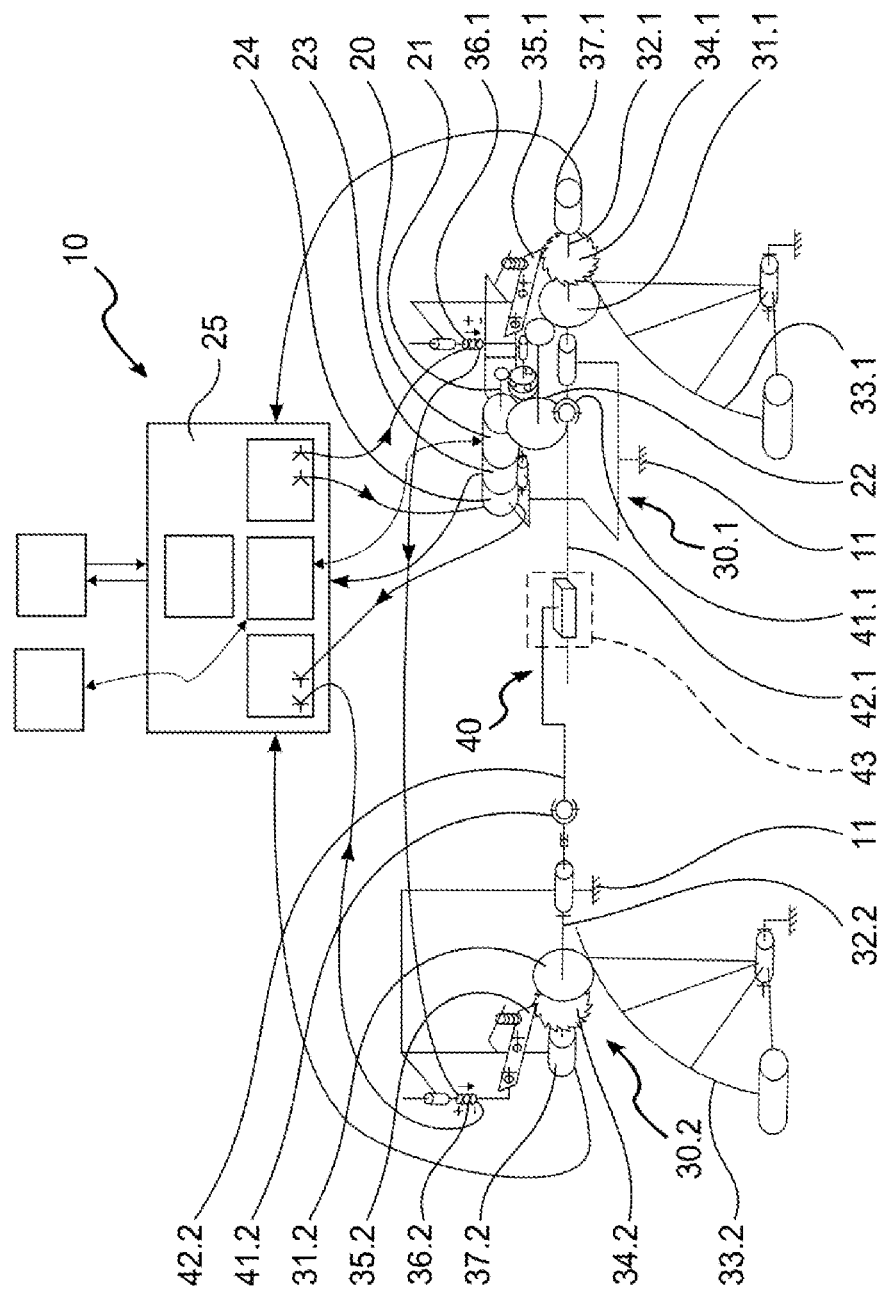
FIG. 2 is a kinematic diagram of one of the actuators of that aircraft, in a first embodiment of the invention.
Figure 3:
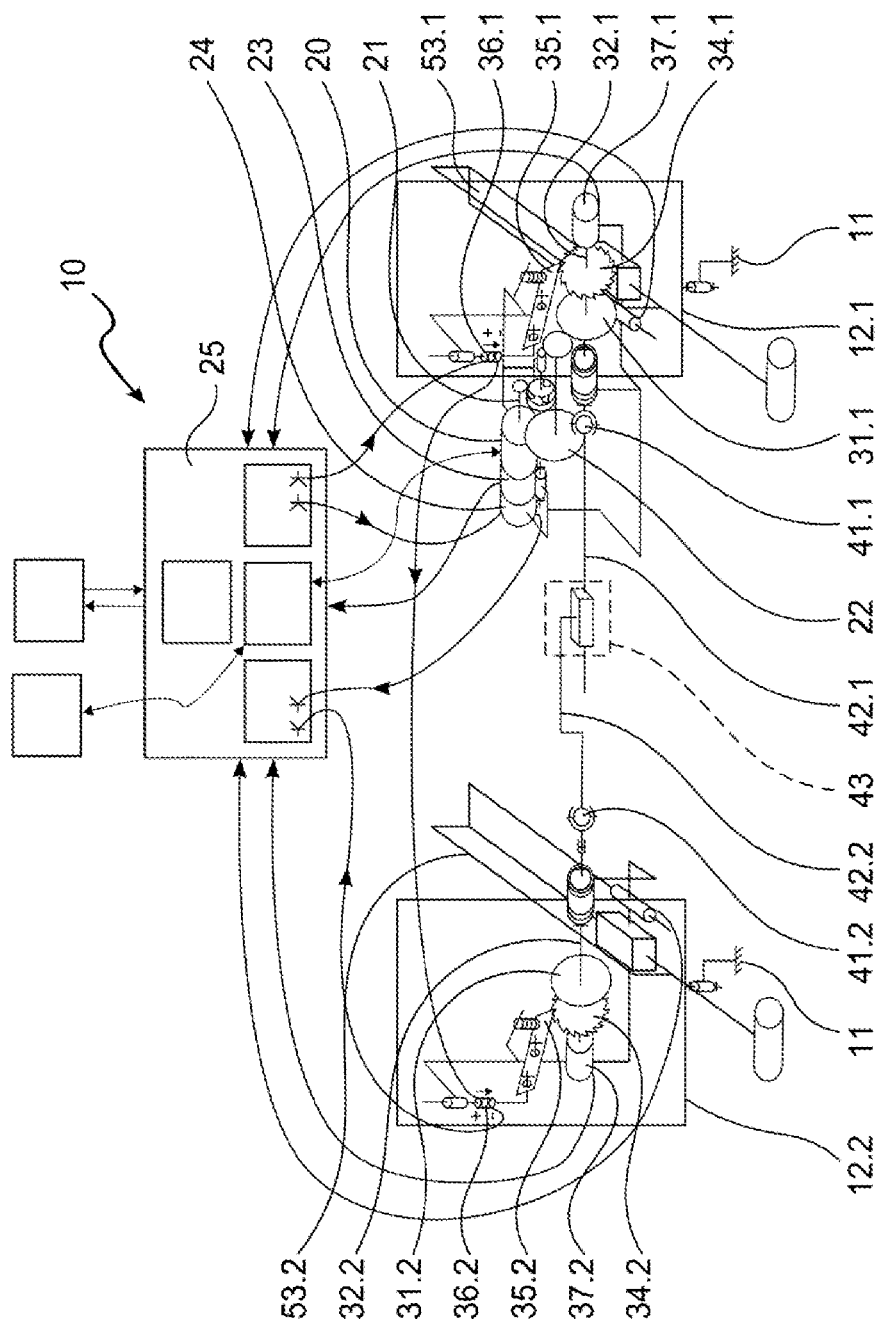
FIG. 3 is a kinematic diagram of one of the actuators of that aircraft, in a second embodiment of the invention.

The embodiment of FIG. 3 is identical to the embodiment of FIG. 2 except that the pinion 31.1, 31.2 of each actuator member 30.1, 30.2 meshes with a rack 53.1, 53.2 instead of with a toothed sector 33.1, 33.2. The rack 53.1, 53.2 is mounted to slide along a direction perpendicular to the pivot axis of the flap 3.1, 3.2, 4.1, 4.2 and it has one end hinged to a lever that is secured to said flap. Each rack 53.1, 53.2 is also associated with a position sensor, in this example of the linear variable differential transducer (LVDT) type.

In addition, each actuator member 30.1, 30.2 in this example is mounted on an intermediate structure 12.1, 12.2 that is mounted on the structure 11 to pivot about an axis perpendicular to the pivot axis of the flap 3.1, 3.2, 4.1, 4.2 and perpendicular to the sliding direction of the rack 53.1, 53.2 so as to form a Cardan joint allowing the racks 53.1, 53.2 to pivot freely when they exert a force on the flaps.

The operation of the actuator 10 in the second embodiment is otherwise identical to the operation of the first embodiment.

Naturally, the invention is not limited to the embodiments described but covers any variant coming within the definition of the invention that appears in the claims.

In particular, the invention is applicable to actuating any flight control surface, and for example ailerons, rudders, flaps, slats, elevators, . . . .

The computers of the control unit 5 may be centralized or they may be distributed between a central unit situated in the vicinity of the cockpit of the aircraft for centralizing processing of piloting instructions coming from the cockpit, and dedicated units connected to the central unit and arranged closer to the actuators 10 in order to control them as a function of commands generated by the central unit on the basis of the piloting instructions.

The racks may be replaced by ball screws.

The coupling 43 may be provided by pinning, by an arrangement of fluting that is not symmetrical about the axis of rotation of the shafts 42.1, 42.2, or in some other way.

The transmission line 40 may be connected to the pinions 31.1, 31.2 without passing via Cardan joints.

The pinion 31.1, 31.2 need not mesh with the toothed sector or the rack, the shafts 32.1, 32.2 being provided with another pinion for that purpose.

The pawls are optional and they may be installed differently. For example, the pawls may act on the toothed sector or the rack. The pawls may be replaced by latches.

The resolvers may be replaced by any type of angular position sensor.

The invention claimed is:

1. An actuator for at least one flight control surface of an aircraft, the actuator comprising at least two actuator members configured for actuating the flight control surface between two extreme positions and a motor connected to the actuator members by at least one rotary motion transmission line, each actuator member comprising a drive pinion and the actuator being configured so that the transmission line has an angular amplitude of less than one revolution during movement of the flight control surface between its two extreme positions, and the motion transmission line is configured to allow only one angular position between the drive pinions of the actuator member.

2. The actuator according to claim 1, wherein the transmission line has two shaft segments that are releasably connected to rotate together by a coupling that allows only one angular position between the shaft segments.

3. The actuator according to claim 1, wherein the transmission line is connected to the inlet element of each actuator member via a universal joint.

4. The actuator according to claim 1, wherein the actuator member comprises a toothed sector connected in rotation with the drive pinion and secured to the flight control surface.

5. The actuator according to claim 1, wherein the inlet pinion of each actuator member meshes with a rack that is slidably fastened to a structure of the aircraft and that is hinged to a lever secured to the flight control surface.

6. The actuator according to claim 1, wherein each actuator member includes an angle sensor connected in rotation with the drive pinion.

7. The actuator according to claim 1, wherein the motor is associated with an angle sensor and with a brake, both of which are connected to the control module.

8. An aircraft having wings each provided with at least one flap, each flap being associated with an actuator according to claim 1, and the actuators being connected to a control unit of the aircraft.

9. The aircraft according to claim 8, wherein each wing is provided with an inner flap and with an outer flap, and the control unit is arranged to be capable of controlling the flaps independently of each other.

\* \* \* \* \*